(12) United States Patent
Grubb

(10) Patent No.: US 11,099,586 B2
(45) Date of Patent: Aug. 24, 2021

(54) DC CANCELLER ADAPTIVE FILTER FOR ATTENUATING NOISE IN A FEEDBACK PATH OF A FLOW CONTROLLER

(71) Applicant: Norgren Limited, Lichfield Staffordshire (GB)

(72) Inventor: Mark Richard Grubb, Lichfield Staffordshire (GB)

(73) Assignee: NORGREN LIMITED, Lichfield (GB)

( * ) Notice: Subject to any disclaimer, the term of this patent is extended or adjusted under 35 U.S.C. 154(b) by 291 days.

(21) Appl. No.: 15/752,306

(22) PCT Filed: Aug. 10, 2016

(86) PCT No.: PCT/GB2016/052479
§ 371 (c)(1),
(2) Date: Feb. 13, 2018

(87) PCT Pub. No.: WO2017/029474
PCT Pub. Date: Feb. 23, 2017

(65) Prior Publication Data
US 2018/0231990 A1    Aug. 16, 2018

(30) Foreign Application Priority Data

Aug. 17, 2015   (GB) .................................... 1514575

(51) Int. Cl.
*G05D 7/06* (2006.01)
*G05B 13/02* (2006.01)
*G01F 1/00* (2006.01)

(52) U.S. Cl.
CPC ............. *G05D 7/0635* (2013.01); *G01F 1/00* (2013.01); *G05B 13/025* (2013.01)

(58) Field of Classification Search
CPC ........ G05D 7/0635; G01F 1/00; G05B 13/025
See application file for complete search history.

(56) References Cited

U.S. PATENT DOCUMENTS 6,789,558 B2 * 9/2004 Coakley ................ F15B 19/002
137/10
2002/0114732 A1 * 8/2002 Vyers .................... G01F 1/6847
422/62

(Continued)

OTHER PUBLICATIONS

Singh, Adaptive Noise Cancellation (Year: 2001).*
Corresponding International Search Report and Written Opinion for PCT/GB2016/052479 dated Nov. 7, 2016.

*Primary Examiner* — Jennifer L Norton
(74) *Attorney, Agent, or Firm* — The Belles Group, P.C.

(57) ABSTRACT

Electronics with a DCC adaptive filter for attenuating noise in a feedback path of a flow controller are provided. The electronics include a signal processor configured to receive a flow signal from a flow sensor, the flow sensor is configured to measure a flow rate of a pulsating fluid flow, receive a constant reference signal, and generate a flow rate signal using the constant reference signal and the flow signal. The electronics also include a controller communicatively coupled to the signal processor, which is configured to generate a flow rate control signal using the flow rate signal. The electronics additionally include a signal generator communicatively coupled to the controller. The signal generator is configured to receive the flow rate control signal, generate a valve signal based on the flow rate control signal, and provide the valve signal to a valve to control the flow rate of the pulsating flow.

13 Claims, 5 Drawing Sheets

(56) References Cited

U.S. PATENT DOCUMENTS

| | | | |
|---|---|---|---|
| 2004/0016230 A1* | 1/2004 | Hale | F15B 1/021 |
| | | | 60/413 |
| 2007/0262814 A1 | 11/2007 | Patten et al. | |
| 2010/0266134 A1 | 10/2010 | Wertz et al. | |
| 2011/0015791 A1 | 1/2011 | Smirnov et al. | |
| 2011/0215857 A1 | 9/2011 | Nonin | |
| 2012/0020807 A1* | 1/2012 | Fernholz | F04C 14/08 |
| | | | 417/18 |
| 2018/0181146 A1* | 6/2018 | Grubb | G05D 7/0635 |
| 2018/0231989 A1* | 8/2018 | Grubb | G01F 15/00 |

* cited by examiner

DC CANCELLER ADAPTIVE FILTER FOR ATTENUATING NOISE IN A FEEDBACK PATH OF A FLOW CONTROLLER

CROSS-REFERENCE TO RELATED APPLICATIONS

This application is a U.S. national stage application under 35 U.S.C. § 371 of PCT Application No. PCT/GB2016/052479, filed Aug. 10, 2016, which claims priority to United Kingdom Patent Application No. GB1514575.8, filed Aug. 17, 2015, the entireties of which are incorporated herein by reference.

TECHNICAL FIELD

The embodiments described below relate to attenuating noise and, more particularly, to a DC canceller filter and electronics for attenuating noise in a feedback path of a flow controller, and related methods.

BACKGROUND

Fluid delivery is often utilized in industrial, medical, and scientific applications, and may be obtained from a number of different sources. One common source involves a pump that receives a fluid from a fluid supply, displaces the fluid with a mechanical means, and provides the fluid to, for example, a conduit. The mechanical means employed by the pump may be members having a reciprocal motion, such as pistons, peristaltic rotors, or the like. The periodic forces displace the fluid towards the conduit, thereby causing the fluid to flow. Unfortunately, due to the reciprocal motion, the fluid provided by the pump may exhibit pulsations that are carried downstream through the conduit, and may potentially interfere with operation. Accordingly, the pulses are sometimes referred to as fluid born noise ("FBN"). Fluid flow displaying FBN is commonly referred to as a pulsating flow.

In addition, flow path geometries formed by conduits with bends, surface irregularities, or the like, can introduce vortices due to vortex shedding. For example, even in laminar fluid flows, vortices might be generated by the flow path geometry. These vortex trains typically have an interval that is proportional to the flow rate. Accordingly, the faster the fluid flow, the faster the perturbations that are generated by the vortex trains. These vortex trains might travel a distance downstream before the flow re-laminarizes. For sake of discussion simplicity, the portion of the fluid flow with the vortex trains may be viewed as a pulsating flow.

Pumps and conduits having bends and surface irregularities are typically used in fluid control systems, along with any number of valves and valve types. For instance, the valves may be a proportional valves, controlled by a flow controller in association with a fluid pump. For a more specific example, a proportional valve downstream from a pump may control a flow rate of a fluid by utilizing a flow sensor. In particular, a flow sensor may measure the flow rate of the fluid flowing through a conduit and provide a flow rate signal to a flow controller. A flow rate signal from the controller may then adjust the valve in a manner proportional to the measured flow rate of the fluid. Using the flow rate signal, the proportional valve may thus control the flow rate of the fluid through the conduit.

However, due to the FBN, perturbations, or other disturbances in the fluid flow, the flow rate signal may also include noise. The noise can cause the proportional valve to be unstable. For example, a position of the proportional valve may not correspond to a flow rate set point and, instead, may continuously oscillate about the set point. Accordingly, it is desirable to attenuate the noise in the flow rate signal.

Passive filters can attenuate the noise component if the noise component has a known or constant frequency. However, the noise component's frequency is often correlated with pump speed. For example, as the pump's rotation speed increases, the noise component's frequency also increases. In addition, the flow rate of the fluid flow may also rapidly change for various reasons, such as a change in the flow rate set point. Due to the rapid changes, the flow rate measurement may have some components with a frequency greater than zero. Thus, passive filters may undesirably attenuate the rapid changes in the flow rate measurements, thereby causing inaccurate flow rate measurements.

These and other issues may be resolved by employing adaptive filters. Accordingly, there is a need for an adaptive filter for attenuating noise in a feedback path of a flow controller.

SUMMARY

Electronics with a DCC adaptive filter for attenuating noise in a feedback path of a flow controller are provided. The electronics comprise a signal processor configured to receive a flow signal from a flow sensor, the flow sensor being configured to measure a flow rate of a pulsating fluid flow, receive a constant reference signal, and generate a flow rate signal using the constant reference signal and the flow signal. The electronics also comprise a controller which is configured to generate a flow rate control signal using the flow rate signal. A signal generator is communicatively coupled to the controller, and is configured to receive the flow rate control signal, generate a valve signal based on the flow rate control signal, and provide the valve signal to a valve to control the flow rate of the pulsating flow.

A method employing a DCC adaptive filter for attenuating noise in a feedback path of a flow controller is provided. The method comprises receiving a flow signal from a flow sensor, the flow sensor being configured to measure a flow rate of a pulsating fluid flow, generating a constant reference signal, generating a flow rate signal using the constant reference signal and the flow signal, generating a flow rate control signal using the flow rate signal, generating a valve signal based on the flow rate control signal, and providing the valve signal to a valve to control the flow rate of the pulsating flow.

A system with a DCC adaptive filter for attenuating noise in a feedback path of a flow controller is provided. The system comprises a fluid control system. The fluid control system comprises a valve and a flow sensor fluidly coupled to the valve, the flow sensor configured to measure a flow rate of a pulsating fluid flow. Electronics are communicatively coupled to the valve and the flow sensor. The electronics are configured to receive a flow signal from a flow sensor, generate a constant reference signal, generate a flow rate signal, generate a flow rate control signal using the flow rate signal, generate a valve signal based on the flow rate control signal, and provide the valve signal to the valve to control the flow rate of the pulsating fluid flow.

Aspects

According to an aspect, electronics with a DCC adaptive filter for attenuating noise in a feedback path of a flow controller comprise a signal processor configured to receive a flow signal from a flow sensor, the flow sensor being configured to measure a flow rate of a pulsating fluid flow, receive a constant reference signal, and generate a flow rate signal using the constant reference signal and the flow signal. The electronics comprise a controller communicatively coupled to the signal processor, the controller being configured to generate a flow rate control signal using the flow rate signal. The electronics comprise a signal generator communicatively coupled to the controller, the signal generator being configured to: receive the flow rate control signal, generate a valve signal based on the flow rate control signal, and provide the valve signal to a valve to control the flow rate of the pulsating flow.

Preferably, the signal processor is configured to: generate a feedback error from a first summation; determine coefficients using the feedback error; and generate an estimate of a DC component of the flow signal using the coefficients.

Preferably, the DCC adaptive filter is configured to generate the flow rate signal from the flow signal by attenuating an AC component in the flow signal.

Preferably, the signal processor is configured to determine the coefficients with an adaptive algorithm, wherein the coefficients are used for attenuating an AC component in the flow signal.

Preferably, the signal generator comprises a pulse width modulator and a valve drive circuit.

Preferably, the constant reference signal comprises a voltage.

Preferably, the constant reference signal comprises a voltage of about 1 VDC.

Preferably, the constant reference signal comprises a digital signal.

According to an aspect, a method employing a DCC adaptive filter for attenuating noise in a feedback path of a flow controller comprises: receiving a flow signal from a flow sensor, the flow sensor being configured to measure a flow rate of a pulsating fluid flow; generating a constant reference signal; generating a flow rate signal using the constant reference signal and the flow signal; generating a flow rate control signal using the flow rate signal; generating a valve signal based on the flow rate control signal; and providing the valve signal to a valve to control the flow rate of the pulsating flow.

Preferably, the method further comprises: generating a feedback error from a first summation; determining coefficients using the feedback error; and generating an estimate of a DC component of the flow signal using the coefficients.

Preferably, the method further comprises: receiving the constant reference signal;

attenuating an AC component in the flow signal; and generating the flow rate signal using the constant reference signal, the feedback error, and the flow signal.

Preferably, the constant reference signal comprises a voltage.

Preferably, the voltage is about 1 volt DC.

Preferably, the constant reference signal comprises a digital signal.

Preferably, generating the flow rate signal from the constant reference signal comprises attenuating an AC component in the flow signal from the flow sensor.

According to an aspect a system with a DCC adaptive filter for attenuating noise in a feedback path of a flow controller comprises a fluid control system comprising: a valve; a flow sensor fluidly coupled to the valve being configured to measure a flow rate of a pulsating fluid flow; and electronics communicatively coupled to the valve and the flow sensor. The electronics are configured to: receive a flow signal from a flow sensor; generate a constant reference signal; generate a flow rate signal; generate a flow rate control signal using the flow rate signal; generate a valve signal based on the flow rate control signal; and provide the valve signal to the valve to control the flow rate of the pulsating fluid flow.

Preferably, the electronics are configured to: receive a feedback error from a first summation; determine coefficients using the feedback error; and generate an estimate of a DC component of the flow signal using the coefficients.

Preferably, the electronics are configured to: receive the constant reference signal;

attenuate an AC component in the flow signal; and generate the flow rate signal using the constant reference signal, the feedback error, and the flow signal.

DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of a DCC adaptive filter for attenuating noise in feedback path of a flow controller. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the DCC adaptive filter for attenuating the noise in the feedback path of the flow controller. As a result, the embodiments described below are not limited to the specific examples described below, but only by the claims and their equivalents.

Figure 1:
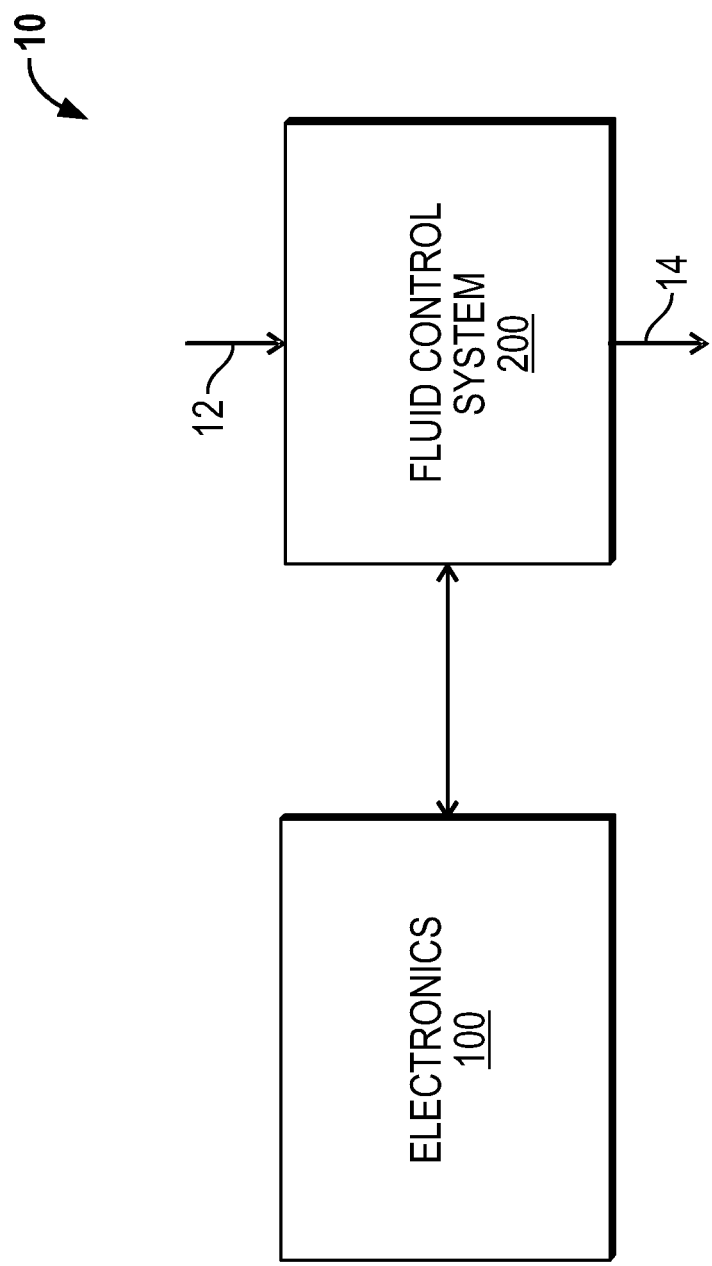
FIG. 1 shows a system 10 having an adaptive filter for attenuating noise in a feedback path of a flow controller according to an embodiment.

FIG. 1 shows a system 10 for attenuating noise in a feedback path of a flow controller according to an embodiment. As shown in FIG. 1, the system 10 includes electronics 100 that are communicatively coupled to a fluid control system 200. The system 10 also includes a fluid supply 12, which is fluidly coupled to the fluid control system 200. The fluid supply 12 may be fluidly coupled to the fluid control system 200 via a conduit, pipeline, or the like. The fluid may be any fluid, such as, for example, compressible or incompressible fluids, liquids, gasses, fluids with mixed phases, emulsions, suspensions, etc. The fluid control system 200 may control the fluid supplied by the fluid supply 12 to provide a fluid flow 14, which is illustrated by an arrow. The fluid control system 200 may include a pump exhibiting a reciprocating motion and, therefore, may be prone to causing one or more pulses in the fluid flow 14. Similarly, the conduit, pipeline, or the like, may have flow path geometries that induce vortices, which can also lead to a pulsating fluid flow 14.

The electronics 100 may receive a flow signal from, for example, a flow sensor in the fluid control system 200 and provide a valve signal to a flow controller, such as a valve, in the fluid control system 200. The valve signal may be based on a flow rate control signal that is determined by the electronics 100. The electronics 100 may generate the flow rate control signal by employing the flow signal from the flow sensor in the fluid control system 200. The flow rate control signal is a signal that controls the flow rate of the fluid in fluid control system 200. Accordingly, the electronics 100 may attenuate the noise in the flow rate signal, as will be explained in more detail in the following with reference to FIGS. 2 and 3.

Figure 2:
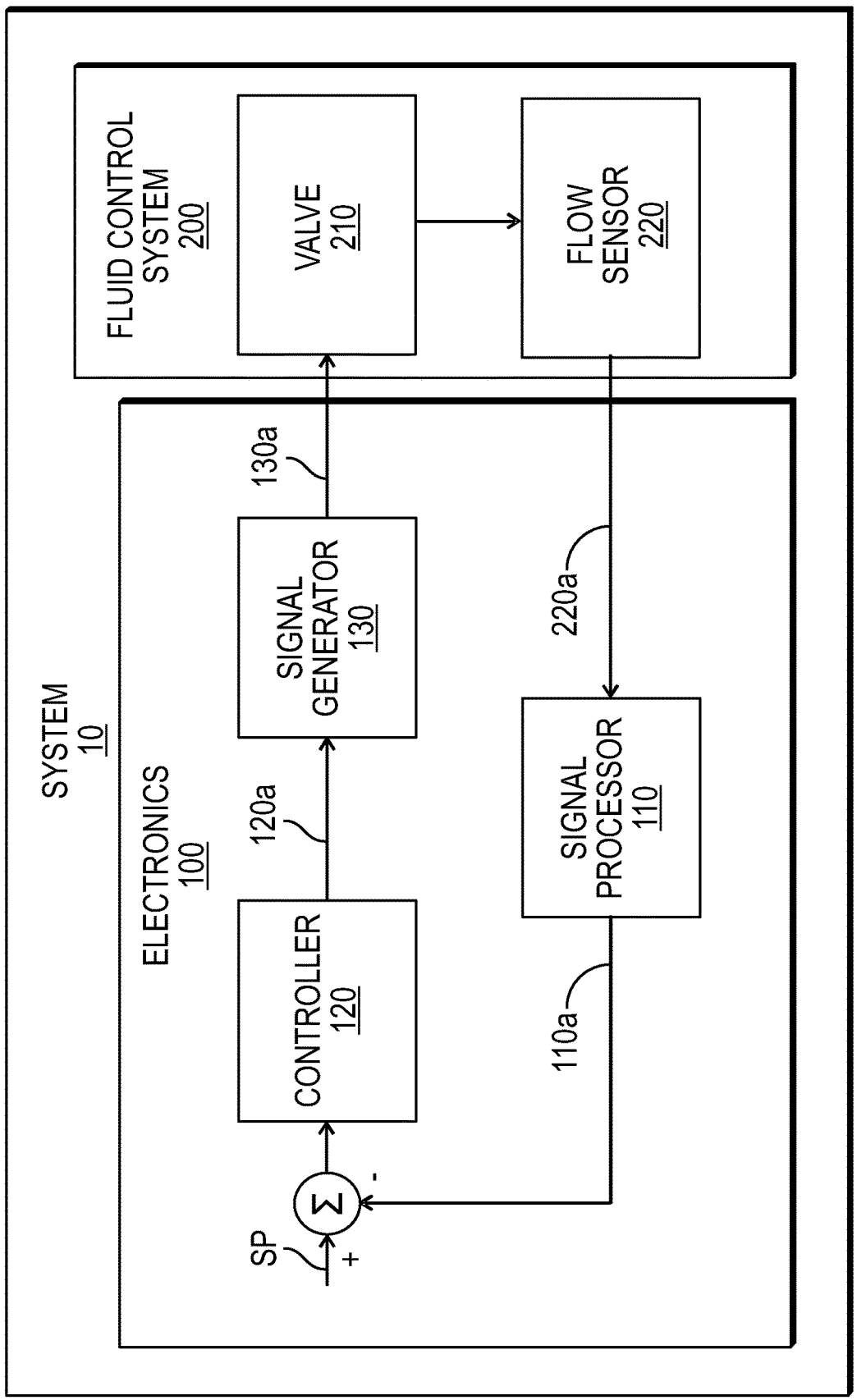
FIG. 2 shows a more detailed view of the system 10 for the adaptive filter for attenuating the noise in the feedback path of the flow controller.

FIG. 2 shows a more detailed view of the system 10 which employs an adaptive filter for attenuating the noise in the feedback path of the flow controller, according to an embodiment. As shown in FIG. 2, the system 10 includes the electronics 100 and the fluid control system 200 previously described. For clarity, the system 10 is not shown with the fluid supply 12 and the fluid flow 14. In the embodiment shown, the electronics 100 include a signal processor 110 that is communicatively coupled with a controller 120. The controller 120 is also communicatively coupled to a signal generator 130. The signal processor 110 and the signal generator 130 also are communicatively coupled to the fluid control system 200.

In the embodiment shown, the signal processor 110 receives a flow signal 220a from the flow sensor 220. The signal processor 110 employs the flow signal 220a to provide a flow rate signal 110a that is subtracted from a set point SP. The difference between the flow rate signal 110a and the set point SP is provided to the controller 120. The controller 120 receives the difference, determines a flow rate control signal 120a based on the difference, and provides the flow rate control signal 120a to the signal generator 130 that has an AC component removed. The signal generator 130 employs the flow rate control signal 120a to provide a valve signal 130a to the valve 210.

As will be explained in more detail in the following, the electronics 100 are configured to receive the flow signal 220a from the flow sensor 220 and, using the flow signal 220a, generate and provide the valve signal 130a to the valve 210. The electronics 100 can include any appropriate processing system that is configured to process the flow signal 220a to generate the valve signal 130a. For example, the electronics 100 may employ a processor, such as a digital signal processor ("DSP") that is configured to filter, delay, split, combine, amplify, attenuate, or the like, the flow signal 220a. The electronics 100 may also include other electronics such as, for example, a microprocessor that can receive a set point SP, compare the set point SP with a flow rate signal 110a, and output an appropriate flow rate control signal 120a. The electronics 100 may also generate the valve signal 130a based on the flow rate control signal 120a.

The signal processor 110 may include an analog-to-digital ("ADC"), DSP, and any other appropriate electronics configured to receive, condition, and filter the flow signal 220a to provide the flow rate signal 110a. For example, the flow signal 220a may be an analog signal comprised of a voltage that increases or decreases in proportion to the fluid flow rate. The signal processor 110 may include signal conditioning circuits that scales, filters, or the like, the flow signal 220a for the ADC. The ADC may sample the conditioned flow signal 220a to provide a sequence of digital representations to the DSP. Using the DSP, the signal processor 110 may filter the sequence of the digital representations to provide the flow rate signal 110a.

For example, as will be explained in more detail in the following with reference to FIG. 3, the signal processor 110 may include a Direct Current canceller ("DCC") adaptive filter that separates a DC component and an AC component in the flow signal 220a. In the embodiment shown, the DCC filter attenuates the DC component in the flow signal 220a, thereby providing an AC component that is associated with the pulses in the pulsating flow.

The controller 120 employs the set point (SP) and the flow rate signal 110a to determine the flow rate control signal 120a. For example, in the embodiment shown, the controller 120 may be a proportional-integral-differential ("PID") controller, although alternative controllers may be employed in other embodiments. In the embodiment shown, the controller 120 compares the set point SP with the flow rate signal 110a to determine a difference between the set point SP and the flow rate signal 110a. The difference is typically referred to as an error between the set point SP and a measured process variable. The error is then multiplied with the PID parameters to determine a control variable. In the embodiment shown, the measured process variable is the flow rate signal 110a and the control variable is the flow rate control signal 120a.

The flow rate control signal 120a is a signal that corresponds to the error between the measured fluid flow rate and the set point SP. As can be appreciated, due to filtering by the signal processor 110, the flow rate control signal 120a is generated from a signal that is absent of an AC component. Accordingly, the flow rate control signal 120a may be stable even though the flow signal 220a may have an AC component associated with pulses in the pulsating flow. The flow rate control signal 120a is provided to the signal generator 130.

The signal generator 130 receives and converts the flow rate control signal 120a into the valve signal 130a. The valve signal 130a is a signal that controls the fluid flow rate. For example, the valve signal 130a may include a component, such as a current with a magnitude that is proportional to the desired flow rate of the fluid flowing through the fluid control system 200. Alternative signals may be employed in other embodiments.

The valve 210 may be a proportional valve that controls that fluid flow rate relative to a magnitude of the current in the valve signal 130a, although any suitable valve can be employed in alternative embodiments. In the embodiment shown, the valve 210 includes a valve member that is displaced in proportion to a current of a solenoid in the valve 210. For example, the valve member may have a profile that enlarges or decreases a fluid path in the valve 210 when the valve member is displaced by the current. Accordingly, the fluid flow may, for example, be linearly proportional to the current provided to the valve 210.

Since, as discussed in the foregoing, the valve signal 130a is largely absent of the noise associated with the pulses in the pulsating flow, the valve signal 130a can move the valve member in the valve 210 without the oscillations associated with pulses in the pulsating flow. Therefore, the movement of the valve member in the valve 210 is proportional to the difference between the set point SP and the measured fluid flow rate and may be stable despite the noise component in the flow signal 220a, as will be described in more detail in the following with reference to FIGS. 3 and 4.

Still referring to FIG. 2, the flow sensor 220 is comprised of a mass flow meter that employs a sensor that may rapidly respond to changes in the flow rate. For example, the flow sensor 220 may employ a thermal dispersion sensor that transfers heat to the fluid from a heated surface. The heated surface may be a wire filament, film heater element, or the like. These are sometimes known as hot-wire or hot-film mass air flow ("MAF") sensors. The heat transfer does not typically occur to the bulk of the fluid flow, but rather in a thermal boundary layer around the heated surface. Accordingly, the sensors are sometimes referred to as mass flux sensors. Other mass flow sensing technologies may be employed in alternative embodiments, however.

In thermal dispersion sensors, for example, the heated surface may have a volume that is small relative to the fluid flow. As a result, the heat transfer rate changes rapidly in response to changes in the flow rate of the fluid. This characteristic makes them sensitive to local and rapid flow perturbations such as eddies and vortices, as well as pulsating or periodic variations in the bulk flow. The rapid response of the sensor to the changes in the flow rate of the fluid may be viewed as a low pass filter with a cut-off frequency high enough to sense all of the pulses or FBN in the pulsating flow. Therefore, the flow signal 220a provided by the flow sensor 220 not only includes a DC component that corresponds to the fluid flow rate but also an AC component that corresponds to the pulses in the pulsating flow.

As discussed in the foregoing and explained in more detail in the following with reference to FIGS. 3 and 4, a DCC filter may be employed with the flow signal 220a to generate the valve signal 130a, which reduces and/or eliminates the AC component of the flow signal 220a.

Figure 3:
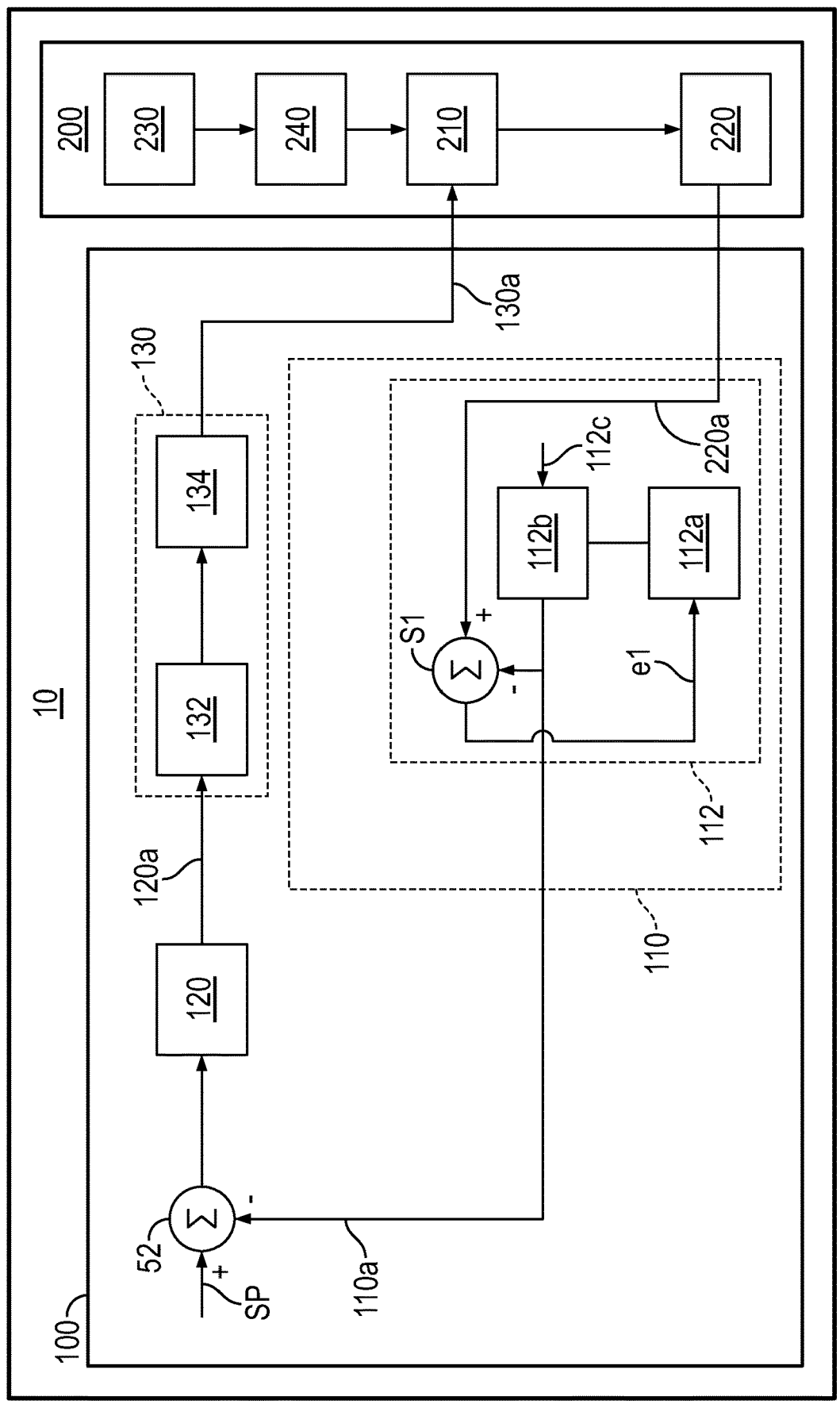
FIG. 3 shows a more detailed view of the system 10 with a DCC adaptive filter for attenuating noise in the feedback path of the flow controller.

FIG. 3 shows a more detailed view of the system 10 with a DCC adaptive filter 112 for attenuating noise in the feedback path of the flow controller. As shown in FIG. 3, the system 10 includes the electronics 100 and fluid control system 200 described above with reference to FIGS. 1 and 2. The signal processor 110, controller 120, and signal generator 130 as well as the set point SP, flow rate signal 110a, flow rate control signal 120a, and valve signal 130a are also shown. In the more detailed view, the signal processor 110 includes the DCC adaptive filter 112. Also in the more detailed view, the signal generator 130 includes a pulse width modulator 132 communicatively coupled with a valve driver 134. The valve signal 130a is provided by the valve driver 134.

In addition to the valve 210 and the flow sensor 220 shown in FIG. 2, the fluid control system 200 includes a pump 230 and pressure regulator 240. In the embodiment shown, the pump 230 may be an air generator, for example, with a reciprocating member that compresses air for use in a pneumatic system. Using a local air generator may in some embodiments be advantageous over, for example, bottled air due to smaller utilized space, sustained supply, etc. However, the pump 230 may be prone to providing compressed air with pulsating flow due to the use of a reciprocating member.

The pressure regulator 240 may be a pressure regulator that controls the pressure to prevent the compressed air from deviating from a desired pressure level. However, in alternative embodiments, other configurations may be employed. The pulses may also be caused by something other than the pump 230. In the embodiment shown, the pump 230 receives fluid from a fluid supply and provides the fluid, via the pressure regulator 240, to the valve 210 and the flow sensor 220, which may control and measure the fluid flow rate.

Also shown in FIG. 3 is a more detailed view of the signal processor 110. In the more detailed view, the DCC adaptive filter 112 provides the flow rate signal 110a, which is subtracted from the set point SP at a second summation S2. The difference between the flow rate signal 110a and the set point SP is provided to the controller 120.

A first summation S1 in the DCC adaptive filter 112 receives the flow signal 220a from the flow sensor 220 and a signal from a digital filter 112b. The flow signal 220 contains both noise and a desired signal. An adaptive algorithm 112a is communicatively coupled to the first summation S1. More specifically, the adaptive algorithm 112a is configured to receive a feedback error e1 from the first summation S1. The adaptive algorithm 112a employs the feedback error e1 to determine and provide coefficients to the digital filter 112b, which will be discussed in more detail below. A constant reference signal 112c is provided to the digital filter 112b. The constant reference signal 112c is set at a constant value. In an embodiment, the constant value is a digital signal. In an embodiment the digital signal may be provided by computer software. In an embodiment, the constant value is a voltage. In an embodiment, the constant value is a DC voltage. In an embodiment, the constant value is about 1 VDC, although any suitable value or voltage may be employed in alternative embodiments. The use of a reference input with a constant value of 1 causes cancellation of the DC component from the input signal at the output of the first summation S1. The operation at the first summation S1 leads the digital filter 112b to provide a DC component of flow signal 220a as the flow rate signal 110a, and the unwanted AC signal of the flow signal 220a appears at the first summation S1 output as feedback error e1.

The adaptive algorithm 112a receives the feedback error e1, and determines and provides coefficients for the digital filter 112b. The adaptive algorithm 112a may be any appropriate algorithm configured to determine (e.g., calculate, estimate, etc.) the coefficients for the digital filter 112b. For example, in the embodiment shown, the adaptive algorithms 112a may be a least mean-square ("LMS") algorithm. However, other algorithms may be employed in the same or alternative embodiments.

The digital filter 112b filters its received signal using the coefficients determined by the adaptive algorithm 112a. For example, the digital filter 112b may be a finite impulse response ("FIR") filter with N number of taps of the received signal. Other filters, such as an infinite impulse response filter ("IIR") filter may be employed in alternative embodiments. Each of the taps may have an associated coefficient determined by the adaptive algorithm 112a. The values of the coefficients determine the properties of the filter such as, for example, the attenuating frequency, magnitude of the attenuation, or the like. As will be explained in more detail in the following, the DCC adaptive filter 112 provides the flow rate signal 110a which is utilized to ultimately attenuate the noise in the flow signal 220a.

In the embodiment shown, the DCC adaptive filter 112 is a filter that adaptively filters the DC component from the flow signal 220a. Based on the feedback error e1, the adaptive algorithm 112a determines the coefficients that attenuate the DC component in the flow signal 220a. More specifically, the constant reference signal 112c serves as a reference signal for a notch filter where, in the embodiment shown, the value of '1' serves as a reference signal for a DC component or low frequency drift that may be present in the flow signal 220a. Accordingly, the digital filter 112b uses the feedback error e1 to output a signal that is an estimate of the DC component in the flow signal 220a.

The signal outputted by the digital filter 112b is provided to the first summation S1. Since the signal outputted by the digital filter 112b tracks, or is equivalent to, the DC component of the flow signal 220a, subtracting the signal outputted by the digital filter 112b from the flow signal 220a results in the AC component of the flow signal 220a being outputted. The AC component in the flow signal 220a may be due to the pulses of a pulsating fluid flow.

Overall, the flow rate signal 110a from the digital filter 112b may be ultimately provided to the controller 120, thus acting as a filtered feedback signal that tracks changes in perturbation frequency. As discussed in the foregoing, the controller 120 employs the difference between the set point SP and the flow rate signal 110a to determine the flow rate control signal 120a. The signal generator 130 uses the flow rate control signal 120a to generate the valve signal 130a, which controls the valve 210 so the fluid flow rate trends towards or remains stable at the set point SP. Since the flow rate signal 110a does not have the noise component associated with the pulses, or at least a greatly attenuated noise component, the movement of the valve member in the valve 210 is minimally affected by the pulses in the pulsating stream, thus resulting in a more stable fluid flow despite the presence of such pulses.

It should be understood that the embodiments provided herein may be comprised of analog circuitry, discrete logic circuitry, software implementations, or combinations thereof.

Figure 4:
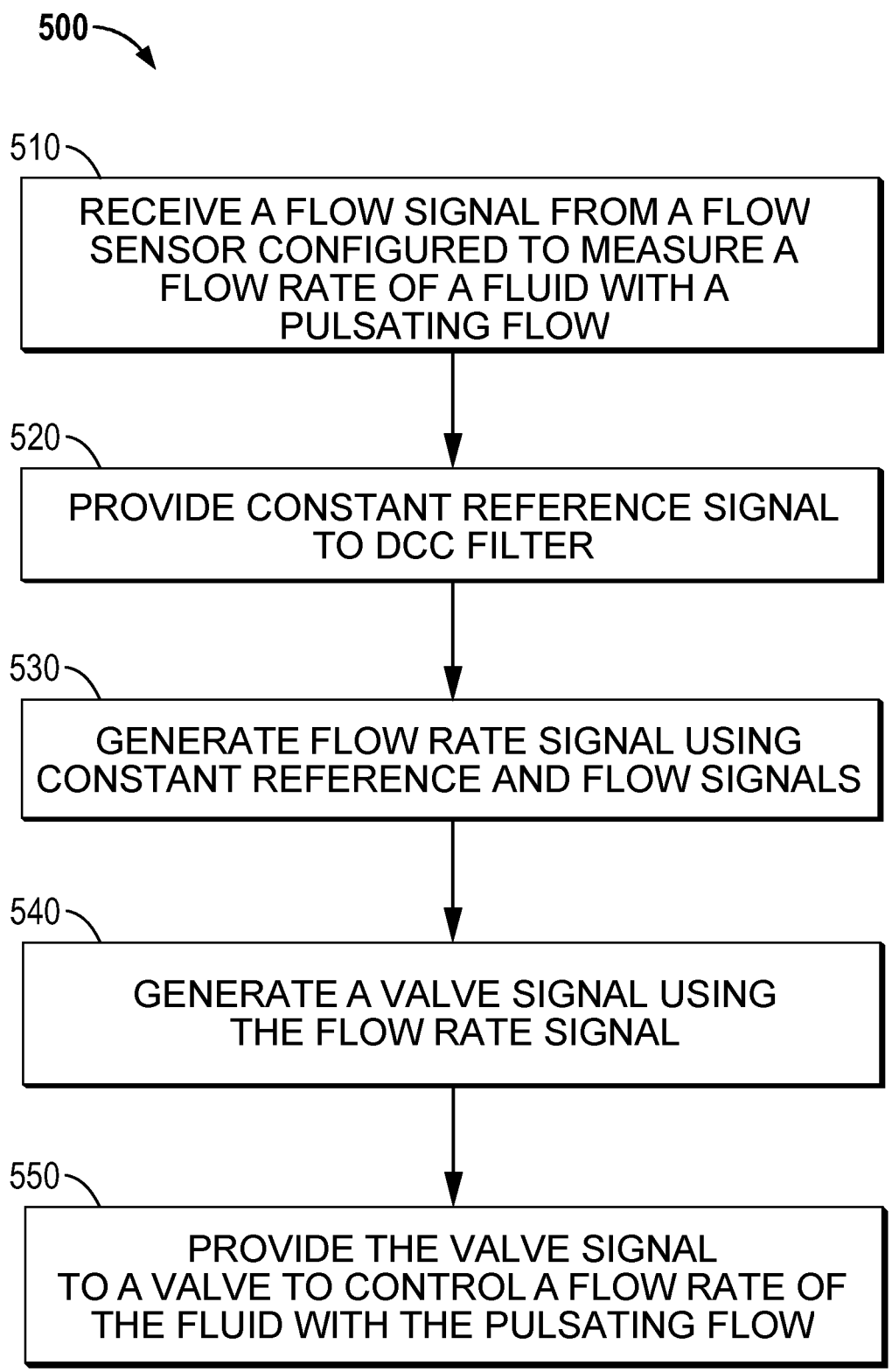
FIG. 4 shows a method 500 employing the DCC adaptive filter for attenuating noise in a feedback path of a flow controller according to an embodiment.

FIG. 4 shows a method 500 of employing the DCC adaptive filter 112 for attenuating noise in a feedback path of a flow controller according to an embodiment. The method may be performed by the system 10 described in the foregoing although any suitable system may be employed in alternative embodiments. The method 500 begins with step 510 by receiving a flow signal from a flow sensor configured to measure a flow rate of a fluid with a pulsating flow. In step 520, the method 500 provides a constant reference signal to a DCC filter. Using the constant reference signal, and the flow signal, the method 500, in step 530, generates a flow rate signal. The flow rate signal is a flow rate of the fluid with attenuated flow pulsation signals. In step 540, the method 500 generates a valve signal using the flow rate signal. The valve signal is provided to a valve to control the flow rate of the fluid.

The flow signal in step 510 may be the flow signal 220a provided by, for example, the flow sensor 220 described in the foregoing. Due to pulses in the pulsating flow, the flow signal may also include an AC component. However, steps 520 through 540 may attenuate the noise in the flow signal to provide a flow rate signal.

For example, step 520 may provide a constant reference signal to the DCC filter. With reference to the system 10 described in the foregoing, the constant reference signal with a constant value of 1 causes cancellation of the DC value from the flow signal 220a, yielding the first summation S1 output as feedback error e1, which corresponds to an AC component of flow signal 220a. This AC component is effectively filtered by the DCC adaptive filter 112, and in step 530, the flow rate signal is generated by the DCC adaptive filter 112. The flow rate signal may be generated by alternative methods in other embodiments, however.

In the embodiments described in the foregoing, the subtraction at first summation S1 attenuates the DC component in the flow signal 220a, composite signal, or the like, to provide the feedback error e1. The first digital filter 112b provides an estimate of the DC component in the flow signal 220a that, when subtracted from the flow signal 220a at first summation S1, provides the feedback error e1. Feedback error e1 corresponds to an AC component of flow signal 220a with an attenuated DC component. The feedback error e1 is used to adapt the coefficients 112a of the digital filter 112b such that the signal outputted by the digital filter 112b tracks, or is equivalent to, the DC component of the flow signal 220a. The filter coefficients 112a are adapted to minimize the DC component of the feedback error e1, and in so doing generate an estimate of the DC component at the output of 112b. The DC component at the output of 112b therefore exhibits an attenuated AC component. The DC component of the flow signal may represent the measured flow rate of the fluid, absent of the pulsating flow perturbations. The DC component can be subtracted from a set point SP to provide the valve signal. Since the valve signal is generated from the DC component with attenuated, or no, noise in the flow signal, the movement of a valve member in the valve may be stable. Therefore, the fluid flow rate may trend towards or remain stable at the point SP even though there are pulses in the pulsating flow.

Figure 5:
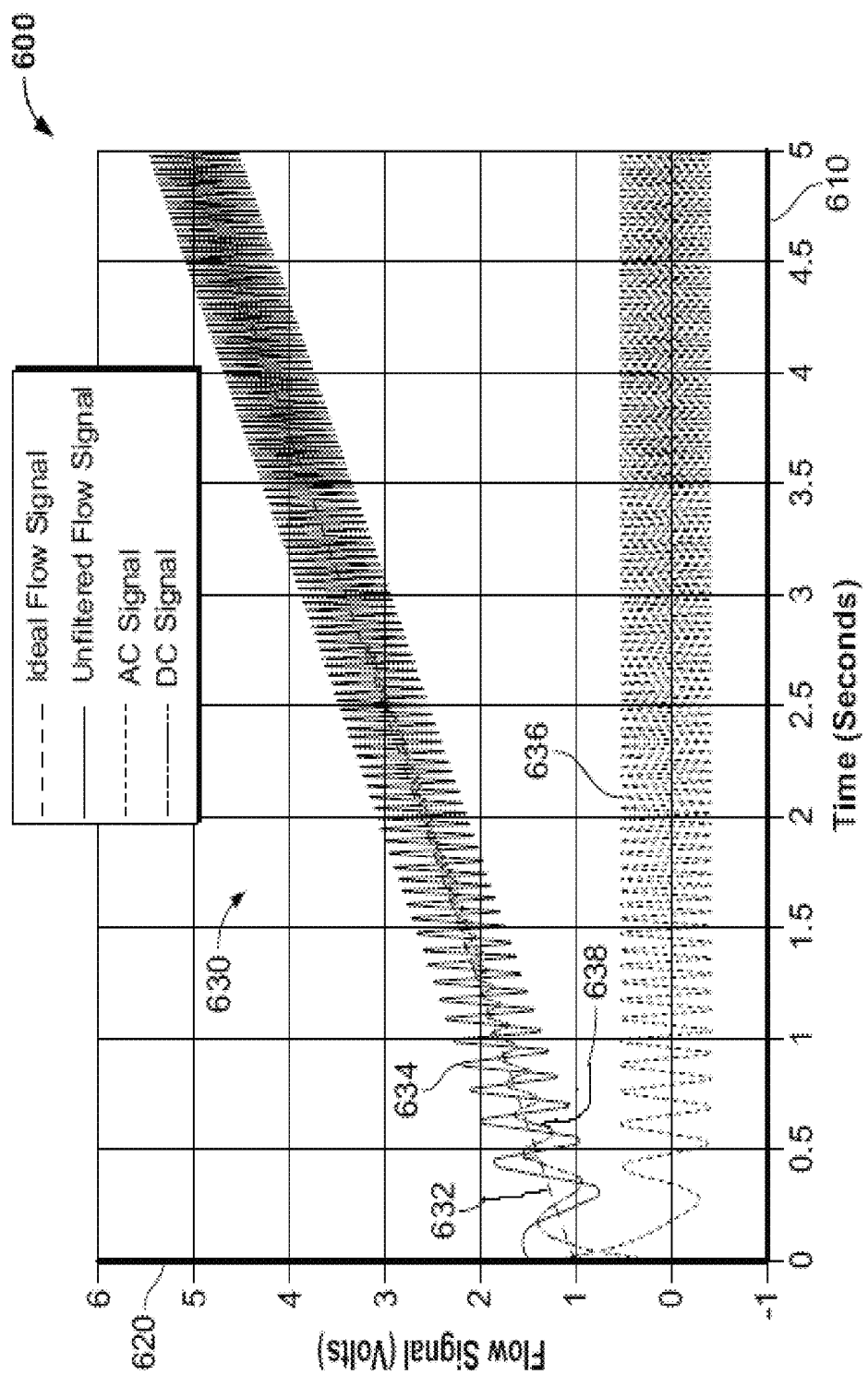
FIG. 5 shows a graph 600 illustrating signals that are received, filtered, and generated by the DCC adaptive filter according to an embodiment.

FIG. 5 shows a graph 600 illustrating signals that are received, filtered, and generated by a DCC adaptive filter according to an embodiment. The graph 600 includes an abscissa, which is a time axis 610, and an ordinate, which is a flow signal axis 620. The time axis 610 is in units of seconds and the flow signal axis 620 is in units of volts, although any suitable units may be employed in alternative embodiments. Also shown is a legend to assist in understanding the graph 600. The graph 600 also includes signals 630. The signals 630 are comprised of an ideal flow signal 632, unfiltered flow signal 634, AC signal 636, and DC signal 638. The signals 630 may be compared to illustrate the operation of the DCC adaptive filter. Alternative embodiments of the signals 630 may include more or fewer and/or different flow signals.

In the embodiment shown, the ideal flow signal 632 illustrates a desirable flow rate over time. The desirable flow rate may be the set point SP described in the foregoing. As can be appreciated from FIG. 5, the ideal flow signal 632 increases linearly over time from about 1 volt to about 5 volts. However, in alternative embodiments, the ideal flow signal 632 may non-linearly increase or decrease, be constant, or the like.

The unfiltered flow signal 634 may be the flow signal 220a described in the foregoing. As can be appreciated, the unfiltered flow signal 634 trends at a rate that is consistent with the ideal flow signal 632. However, the unfiltered flow signal 634 also includes noise due to pulses in a pulsating flow. The noise in the unfiltered flow signal 634 is illustrated as oscillations. As can be appreciated, the frequency of the oscillations is increasing over time. That is, as time increases, the time period between each cycle is decreasing. Therefore, a passive filter with a cutoff frequency that is greater than the lowest frequency (at 0 seconds) and less than the highest frequency (at 3.5 seconds) of the unfiltered flow signal 634 may not attenuate all of the noise in the unfiltered flow signal 634.

The AC signal 636 may be the feedback error e1 signal output from the first summation S1 described in the foregoing, which is provided to the DCC adaptive algorithm 112a. This is an AC noise signal. Using the feedback error e1, the adaptive algorithm 112a can provide coefficients to the first digital filter 112b. The digital filter 112b also receives and operates on the constant reference signal 112c.

Accordingly, the digital filter 112b employs the constant reference signal 112c to generate the flow rate signal 110a, which is illustrated by the DC signal 638.

As can be appreciated from FIG. 5, the AC signal 636 does not trend with the ideal flow signal 632. Accordingly, in addition, the oscillations of the AC signal 636 correspond to the oscillations of the unfiltered flow signal 634. That is, the phase and magnitude of the oscillations in the AC signal 636 are about the same as the phase and magnitude of the oscillations in the unfiltered flow signal 634.

The DC signal 638 may be the flow rate signal 110a described in the foregoing with reference to FIGS. 3 and 4. As can be appreciated, the DC signal 638 includes oscillations that may correspond to the oscillations in the unfiltered flow signal 634, yet are greatly attenuated. However, the oscillations in the DC signal 638 decrease as the time increases. As can also be appreciated, the oscillations in the DC signal 638 decrease as the time increases even though the frequency of the oscillations in the unfiltered flow signal 634 increase.

To illustrate how the signals 630 are generated by the DCC adaptive filter 112, we refer to the embodiments described in the foregoing with reference to FIGS. 3 and 4. However, the embodiments described with reference to FIGS. 3 and 4 may employ any appropriate signals in alternative embodiments. In the embodiments described in the foregoing, the DCC adaptive filter 112 may receive the unfiltered flow signal 634 in the graph 600. The unfiltered flow signal 634 may be representative of the flow signal 220a.

To generate the flow rate signal 110a, the adaptive algorithm 112a iteratively adjusts the coefficients provided to the digital filter 112b based on the feedback error e1 such that the AC noise in the flow signal 220a is largely filtered out. For example, the adaptive algorithm 112a may adjust the coefficients provided to the digital filter 112b according to an LMS algorithm, which minimizes the feedback error e1 received from the first summation S1. However, any suitable algorithm may be employed in alternative embodiments.

Referring to the AC signal 636 shown in FIG. 5, the AC noise component has been filtered from the unfiltered flow signal 634. Accordingly, the AC signal 636 does not increase over time. In addition, the AC signal 636 symmetrically oscillates about zero volts. The AC signal 636 may be generated by subtracting the estimate of the DC component in the flow signal 220a at the first summation. That is, the estimate tracks the increasing DC component in the unfiltered flow signal 634 and, therefore, when the estimate is subtracted from the unfiltered flow signal 634, the output may be the AC signal 636, which is representative of the feedback error e1 signal output from the first summation S1.

The embodiments described above provide a system 10 that includes electronics 100 with a DCC adaptive filter 112 for attenuating noise in a feedback path of a flow controller. The DCC adaptive filter 112 can employ the constant reference signal 112c and the flow signal 220a, and provide an accurate representation of the AC component in the feedback path of the flow controller, which may then be subtracted from the flow signal 220a. Since the flow rate signal 110a may have attenuated noise or no noise, the difference between the set point SP and the flow rate signals 110a may be stabilized and an accurate representation of the difference between the flow rate of the pulsating flow and the set point SP may be determined, thus allowing removal of AC component from the system 10. Accordingly, the valve 210 may stably move towards or remain at the set point SP even though there may be pulses in the pulsating flow.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other adaptive filters for attenuating noise in a feedback path of a flow controller. Accordingly, the scope of the embodiments described above should be determined from the following claims.

We claim:

1. Electronics comprising:
 a signal processor comprising a direct current canceller (DCC) adaptive filter for separating a direct current (DC) component and an alternating current (AC) component in a flow signal to attenuate noise in a feedback path of a flow controller, the DCC adaptive filter configured to:
  receive the flow signal from a flow sensor, the flow signal indicative of a flow rate of a pulsating flow;
  receive a constant reference signal; and
  generate a flow rate signal by iteratively:
   generating a feedback error from a first summation, wherein the first summation receives the flow signal from the flow sensor and a signal from a digital filter;
   determining coefficients using the feedback error;
   generating an estimate of the DC component of the flow signal using the coefficients; and
   generating the flow rate signal using the constant reference signal and the estimated DC component of the flow signal;
 a controller communicatively coupled to the signal processor, the controller being configured to generate a flow rate control signal using the flow rate signal; and
 a signal generator communicatively coupled to the controller, the signal generator being configured to:
  receive the flow rate control signal;
  generate a valve signal configured to control the flow rate of the pulsating flow based on the flow rate control signal; and
  provide the valve signal to a valve to control the flow rate of the pulsating flow.

2. The electronics of claim 1, wherein the DCC adaptive filter is further configured to generate the flow rate signal from the flow signal by attenuating an AC component in the flow signal.

3. The electronics of claim 1, wherein the signal processor is configured to:
 determine the coefficients with an adaptive algorithm, wherein the coefficients are used for attenuating an AC component in the flow signal.

4. The electronics of claim 1, wherein the signal generator comprises a pulse width modulator and a valve drive circuit.

5. The electronics of claim 1, wherein the constant reference signal comprises a voltage.

6. The electronics of claim 5, wherein the constant reference signal comprises a voltage of 1 volt of direct current.

7. The electronics of claim 1, wherein the constant reference signal comprises a digital signal.

8. A method employing a direct current canceller (DCC) adaptive filter for attenuating noise in a feedback path of a flow controller, the method comprising:
- receiving, at the DCC adaptive filter, a flow signal indicative of a flow rate of a pulsating flow from a flow sensor, the flow sensor being configured to measure a flow rate of a pulsating fluid flow;
- generating a constant reference signal that is received by the DCC adaptive filter;
- generating, by the DCC adaptive filter, a flow rate signal by iteratively:
  - generating a feedback error from a first summation, wherein the first summation receives the flow signal from the flow sensor and a signal from a digital filter;
  - determining coefficients using the feedback error;
  - generating an estimate of a direct current (DC) component of the flow signal using the coefficients; and
  - generating the flow rate signal using the constant reference signal and the estimated DC component of the flow signal;
- generating a flow rate control signal using the flow rate signal;
- generating a valve signal configured to control the flow rate of the pulsating flow based on the flow rate control signal; and
- providing the valve signal to a valve to control the flow rate of the pulsating flow.

9. The method of claim 8, wherein the constant reference signal comprises a voltage.

10. The method of claim 8, wherein the voltage is 1 volt of direct current.

11. The method of claim 8, wherein the constant reference signal comprises a digital signal.

12. The method of claim 8, wherein generating the flow rate signal from the constant reference signal further comprises attenuating an AC component in the flow signal from the flow sensor.

13. A system with a direct current canceller (DCC) adaptive filter for attenuating noise in a feedback path of a flow controller, the system comprising:
- a fluid control system comprising:
- a valve;
- a flow sensor fluidly coupled to the valve, the flow sensor configured to measure a flow rate of a pulsating fluid flow; and
- electronics communicatively coupled to the valve and the flow sensor, the electronics comprising a direct current canceller (DCC) adaptive filter for separating a direct current (DC) component and an alternating current (AC) component in a flow signal to attenuate noise in a feedback path of a flow controller, —wherein the electronics are configured to:
  - receive, at the DCC adaptive filter, the flow signal from a flow sensor, the flow signal indicative of a flow rate of a pulsating flow;
  - generate a constant reference signal;
  - generate a flow rate signal by iteratively:
    - generating a feedback error from a first summation, wherein the first summation receives the flow signal from the flow sensor and a signal from a digital filter;
    - determining coefficients using the feedback error;
    - generating an estimate of the DC component of the flow signal using the coefficients; and
    - generating the flow rate signal using the constant reference signal and the estimated DC component of the flow signal;
  - generate a flow rate control signal using the flow rate signal;
  - generate a valve signal configured to control the flow rate of the pulsating flow based on the flow rate control signal; and
  - provide the valve signal to the valve to control the flow rate of the pulsating flow.

* * * * *